United States Patent
Ullegaddi et al.

(10) Patent No.: US 9,892,280 B1
(45) Date of Patent: Feb. 13, 2018

(54) IDENTIFYING ILLEGITIMATE ACCOUNTS BASED ON IMAGES

(71) Applicant: Microsoft Technology Licensing, LLC, Redmond, WA (US)

(72) Inventors: Prashant V. Ullegaddi, Bangalore (IN); David S. M. Freeman, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/871,780

(22) Filed: Sep. 30, 2015

(51) Int. Cl.
  *G06F 7/04* (2006.01)
  *G06F 21/62* (2013.01)
  *G06F 17/30* (2006.01)

(52) U.S. Cl.
  CPC .... *G06F 21/6245* (2013.01); *G06F 17/30256* (2013.01); *G06F 17/30867* (2013.01)

(58) Field of Classification Search
  USPC .......................................................... 726/28
  See application file for complete search history.

(56) References Cited

U.S. PATENT DOCUMENTS

| | | | |
|---|---|---|---|
| 2008/0219495 A1* | 9/2008 | Hulten | G06K 9/6267 382/100 |
| 2009/0234831 A1* | 9/2009 | Ebadollahi | G06F 17/30038 |
| 2012/0158540 A1* | 6/2012 | Ganti | G06Q 30/0609 705/26.35 |
| 2015/0095247 A1* | 4/2015 | Duan | G06Q 30/0185 705/318 |
| 2015/0229664 A1* | 8/2015 | Hawthorn | H04L 63/1408 726/25 |
| 2016/0005050 A1* | 1/2016 | Teman | G06K 9/627 705/317 |

* cited by examiner

*Primary Examiner* — Christopher J Brown
(74) *Attorney, Agent, or Firm* — Hickman Palermo Becker Bingham LLP; Daniel D. Ledesma

(57) ABSTRACT

Techniques for restricting access to certain members of an online service are provided. Member accounts include one or more images. Attributes of member accounts that share the same image are analyzed to determine whether to label the image "bad." In one technique, a model is created and trained to learn the attributes or features (and their corresponding weights) that are associated with "bad" user accounts that share the same image. As a result, member accounts that are associated with a "bad" image may be restricted in one or more ways.

20 Claims, 5 Drawing Sheets

SYSTEM 100

IDENTIFYING ILLEGITIMATE ACCOUNTS BASED ON IMAGES

TECHNICAL FIELD

The present disclosure relates to processing images and, more particularly, to identifying user accounts to restrict based on images associated with the user accounts.

BACKGROUND

An online social network is a group of people who share certain information over a computer network. A social network provider hosts a platform that allows user to create their own social networks. Examples of social network providers include Facebook, Google+, and LinkedIn.

Some unscrupulous individuals seek to obtain user information from social network providers by creating accounts and requesting user profiles. If an unscrupulous user can convince other members of the social network provider to connect with him/her, then that user gains access to the user profiles (containing potentially intimate information) of the other members. Also, the unscrupulous user can spam the other members by sending individual messages to the other members or uploading content that might become part of the other members' content feeds.

Efforts are needed to identify users who violate the terms and conditions of online services and to restrict such users' access to those services.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for restricting access to online accounts based on images associated with the online accounts. In one technique, online accounts that are associated with the same image are identified, attributes of the online accounts are analyzed, and a determination is made whether to label the image "bad" or "good." A "bad" image is one that is associated with (or appears to be associated with) multiple illegitimate online accounts.

In another technique, a particular online account is identified. The particular online account may be a newly-created account or an account that has been active for awhile. An image of the particular online account is identified. The image (or a value that is based on the image) is compared to one or more images that were labeled "bad" manually or automatically, for example, by the algorithm. If there is a match, then the particular online account is restricted in some manner, such as not being able to access an online service through the particular online account.

System Overview

Figure 1:
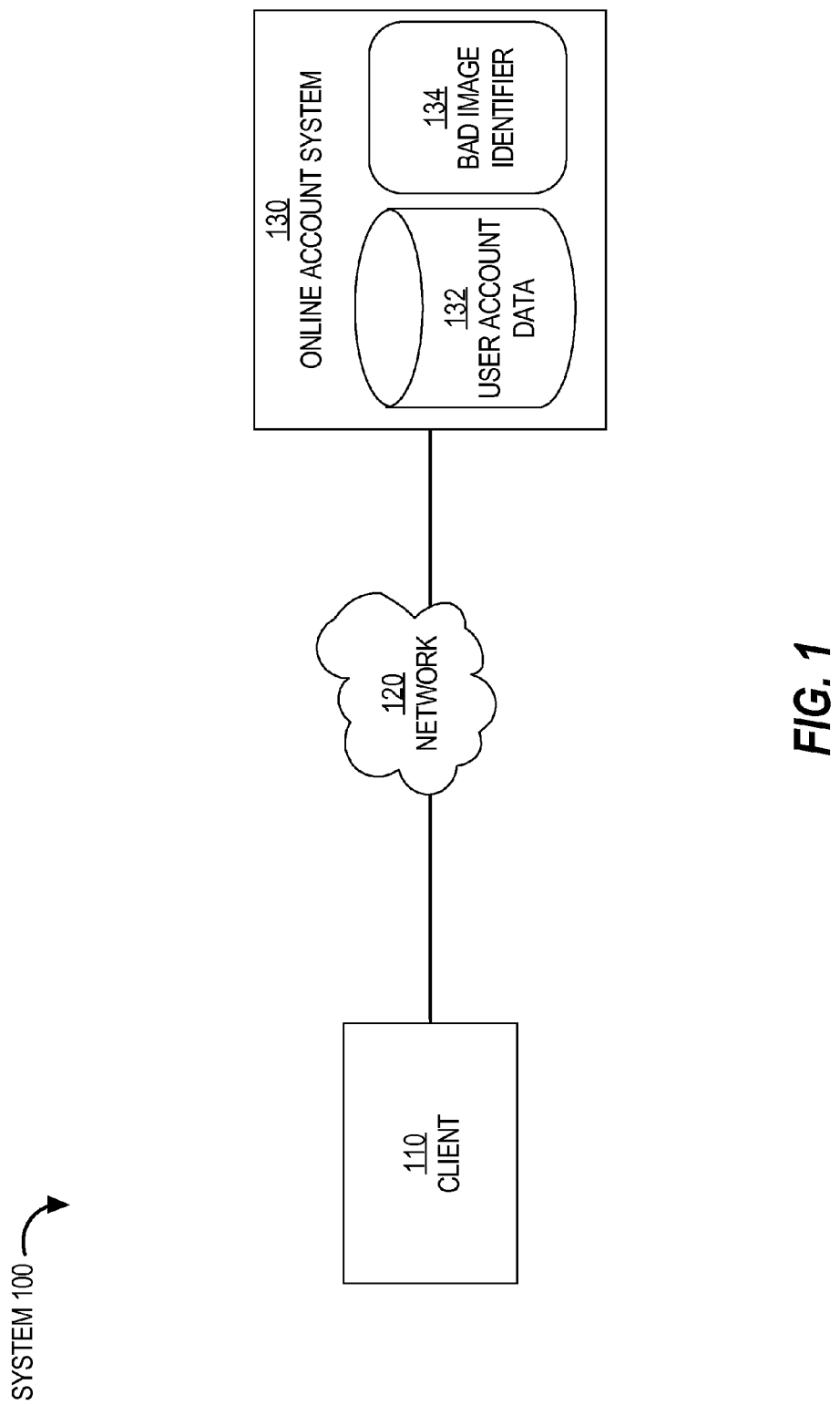
FIG. 1 is a block diagram that depicts an example system for uploading user identifying information to a social network system, in an embodiment.

FIG. 1 is a block diagram that depicts an example system 100 for restricting user access to online accounts based on images associated with the online account, in an embodiment. System 100 includes a client 110, a network 120, and an online account system 130. While only one client 110 is depicted, system 100 may include many clients. Also, while online account system 130 is depicted as a single element, online account system 130 may be implemented on multiple computing devices, some of which are interconnected in a local network and some of which may be distributed globally.

Client 110 is a computing device that communicates with online account system 130 over network 120 through, for example, a web browser or a native application that is specially configured to communicate with online account system 130. Examples of client 110 include a laptop computer, a tablet computer, a desktop computer, and a smartphone. While system 100 includes only one client 110, system 100 may include many clients.

Network 120 may be implemented on any medium or mechanism that provides for the exchange of data between client 110 and online account system 130. Examples of network 120 include, without limitation, a network such as a Local Area Network (LAN), Wide Area Network (WAN), Ethernet or the Internet, or one or more terrestrial, satellite or wireless links.

Online account system 130 includes user account data 132 that includes data about multiple user accounts. At least a subset of the user accounts includes an image; however, some user accounts might not include (or be associated with) any image. An image of a user account is selected by the user that created the user account. For example, a user of client 110 selects an image that is stored on client 110 and causes the image to be uploaded to online account system 130. An image may be of the user or of any object or view, such as a flower or the Milky Way. Additionally, at least some user accounts include personal information, such as first and last name, age, ethnicity, personal address, telephone number, academic history, skills, interests, work history, current job information, financial information, etc.

Embodiments are not limited to the type of computing that an online account system 130 allows. For example, online account system 130 may be provided by a social network provider (e.g., LinkedIn, Facebook, and Google+), a banking institution, or any entity that requests users to upload images to online account system 130.

Depending on the use for online account system 130, online account system 130 may request users to upload personal information. A user account of a registered user (or "member") may include information provided by the member, provided by other members, and/or generated based on an analysis of the member's activity or interaction with online account system 130 and/or with one or more third party services. If a social network provider provides online account system 130, then a user account of a particular user may include connection data, such as a list of other users to which that user is connected in a social graph. Also, in the context of social networking, online account system 130 may enable each member to invite non-members to join online account system 130, to send private messages to each other, to post public messages available for all connections to view, to view profiles of first degree connections (and, optionally, second degree connections), and to search for members (whether connected to them or not) based on one or more search criteria.

Identifying Bad Images

As depicted in FIG. 1, online account system 130 includes a bad image identifier 134 that is implemented in software, hardware, or any combination of hardware and software. Bad image identifier 134 analyzes one or more attributes of a group of user accounts that have a matching (or similar) image to determine whether the matching image should be labeled "bad."

Figure 2:
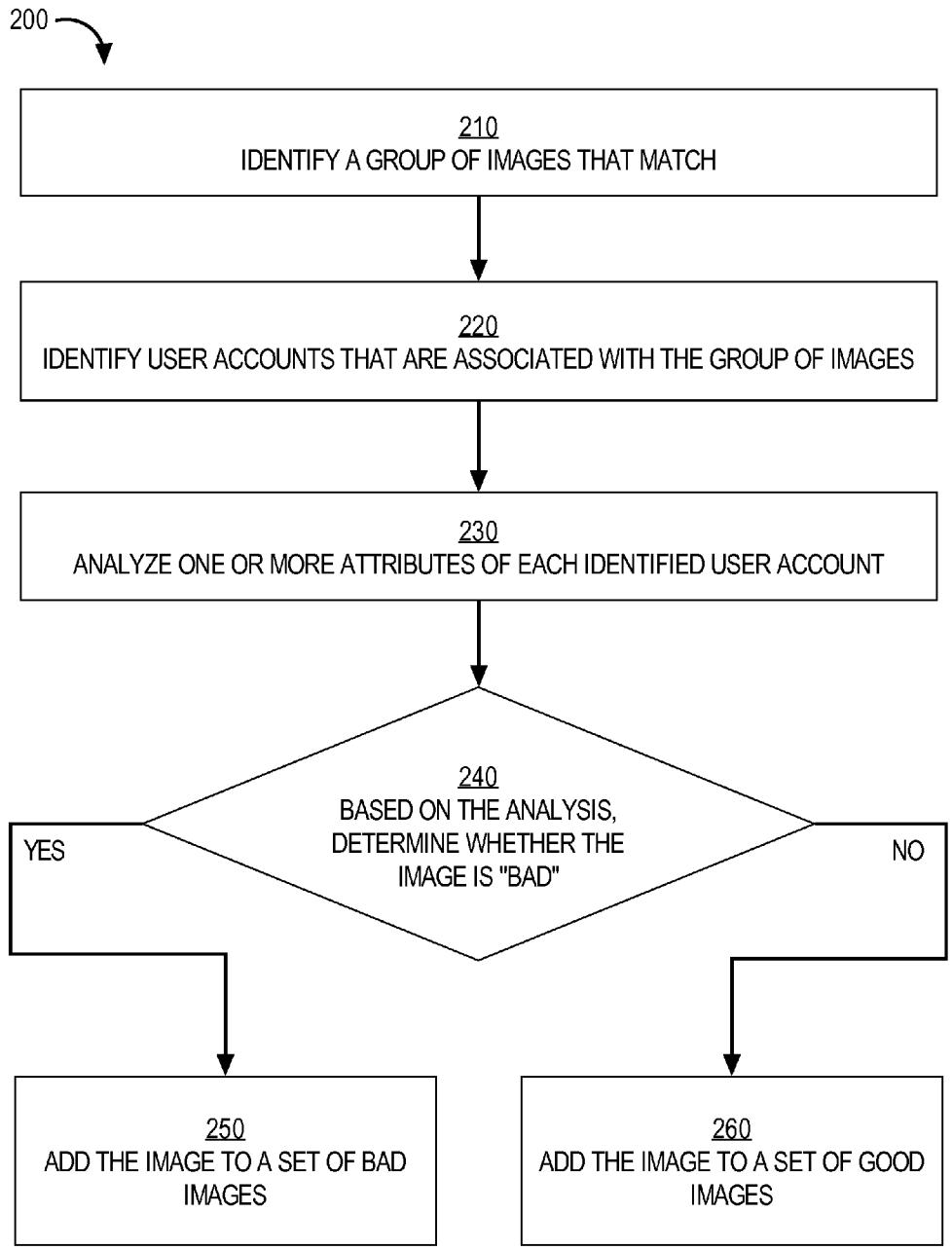
FIG. 2 is a flow diagram that depicts a process for identifying "bad" images, in an embodiment.

FIG. 2 is a flow diagram that depicts a process 200 for identifying "bad" images, in an embodiment. Bad image identifier 134 may perform process 200 or a portion of process 200, such as blocks 230-240. Alternatively, process 200 may be implemented by a system that is separate from online account system 130. Process 200 may be scheduled to run at regular intervals, e.g., daily.

At block 210, a group of images that match each other is identified. Any technique for determining that two images match may be used. Comparing a first image with a second image may involve comparing one or more features of the first image with one or more features of the second image. For example, each pixel in the first image is compared to a pixel (at a corresponding position) in the second image.

In an embodiment, prior to comparing two images, one or both images are converted to a different format, such as from a .png image to a .jpg image. However, such conversion is not necessary if online account system 130 requires all users of online account system 130 to upload images in a particular format or if online account system 130 converts all uploaded images from its users to the particular format.

In another embodiment, instead of comparing pixels or other features detected in the two images, the first image is processed to generate post-processed image data that is compared to post-processed image data of the second image. For example, a first hash value is generated based on the first image and is compared to a second hash value of the second image. Any hashing technique may be used, such as MD5. In this embodiment, a hash table may be created where each hash value (generated from an image) is stored in a hash "bucket" that corresponds to the hash value. If a hash value already exists in a bucket that corresponds to a newly hashed value, then a match is found. Alternatively, a hash bucket may correspond to a range of hash values. In this scenario, a hash bucket may include multiple different hash values, at least some of which will be used to determine whether a current hash value matches any hash value in that hash bucket.

In an embodiment, it is determined that two images match even though the two images are not exactly the same. This is referred to as a "fuzzy match." Any technique for determining that two images fuzzy match may be used.

At block 220, user accounts associated with the group of images are identified. Because each image in the group of images belongs to a different user account, block 210 may have involved keeping a record of the user accounts by, for example, storing matching data that identifies each user account. Each user account may have a unique identifier, such as an identifier that online account system 130 generates or an identifier provided by the user of the user account, such as an email address. Thus, block 220 may involve identifying the matching data. If a hash table is created to store hash values of the various images, then each bucket that corresponds to a hash value may include one or more account identifiers of user accounts that include an image that hashes to that bucket.

At block 230, one or more attributes or features of each user account are identified and analyzed.

Attribute: IP Probability Estimate

An example of an attribute of a user account is an estimate of a likelihood that the corresponding user will visit a web site from a given IP address. The estimate may be based on previous history of the IP address and the user, as well as the user's profile (e.g., specified country of origin/residence or employer name from which a location may be derived) and connection history data that indicates from which IP addresses the user logged in. For example, if the user has only visited the web site from a particular IP address once in one hundred sessions with the web site, then that particular IP address may be associated with a 1% probability. As another example, if, according to connection history data, the user has visited the web site from a certain IP address 50% of the time, then that certain IP address may be associated with a 50% probability. Thus, a user may be associated with multiple IP addresses, where each IP address is associated with a probability estimate. The probability estimates associated with a user may be averaged, weighted averaged, or the maximum probability estimate selected as being associated with the user.

Once an IP probability estimate is determined for a user, an average IP probability estimate over a group of users that include the user may be determined. If the average IP probability estimate of the group is below a particular threshold, then then it is probable that the user accounts in the group were created by an illegitimate user. Alternatively, instead of averaging the IP probability estimates of the users in a group, individual user IP probability estimates are compared to a particular threshold and it is determined how many users in a group have IP probability estimates that are below that particular threshold. If the ratio of such users to the entire group (e.g., 11 out of 15) is above another threshold (e.g., 50%), then it is probable that the user accounts in the group were created by an illegitimate user.

Attribute: Blocked Member

Another example of an attribute of a user account is whether the user account has been blocked or restricted in any manner. For example, a user account may be blocked such that no end-user is allowed to access the user account. As another example, a user account may be restricted in that the user must provide input for a CAPTCHA challenge in order to access another user's user profile. As another example, a user account may be restricted in that the user is limited to uploading two content items per week. Such restrictions are an indication that server system 130 has detected some activity that makes the user account suspicious in one or more ways. An image that is associated with a large number of restricted accounts may be bad, and the likelihood of other unrestricted accounts that use that image being bad is high.

Attribute: Reported Spam

Another example of an attribute of a user account is whether other users have reported spam activity as originating from the user account. In a social network, an illegitimate user may create an account in order to send spam or unsolicited messages to other users, whether the messages specify the other user or appear in content feeds of the other users. The other users may mark such messages as "spam," which marking is recorded by online account system 130.

If a certain number or ratio of user accounts in a group are associated with reported spam, then it is probable that those user accounts (and the group as a whole) were created by an illegitimate user. For example, if 50% of user accounts in a group are associated with reported spam, then there may be an 80% likelihood that the group is created by an illegitimate user.

Other Attributes

Other examples of attributes of a user account include an Internet Service Provider (ISP), an IP address, a join city (determined from the IP address that was used to sign up or register with online account system 130), a hosting organization, and a signup date (or date of registration). Unlike the previous example attributes, these attributes might not be indicators in and of themselves of illegitimate activities. Instead, these attributes are analyzed at a group level to determine whether there is commonality among the user accounts that share the same (or similar) image. For example, if a relatively large percentage of user accounts in a group share the same ISP, then it is more likely that the user accounts in the group were created by an illegitimate user.

A hosting organization is an Internet entity that, according to reputation score, probably hosts and executes unwanted web scraping bots that target a web site, such as one provided by online account system 130. An "Internet entity" any entity (e.g., a business, an organization, a country, a jurisdiction, an Internet Service Provider, etc.) or group of cooperative entities that has been directly or indirectly allocated or assigned one or more Internet addresses via the Internet Assigned Numbers Authority (IRNA), the Internet Corporation for Assigned Names and Numbers (ICANN), a regional Internet registry (e.g., the American Registry for Internet Numbers (e.g., ARIN)), a national Internet registry (e.g., the Japan Network Information Center (e.g., JPNIC), and/or a local Internet registry (e.g., an Internet service provider (ISP), an academic institution, or a company). For example, a hosting organization may be an autonomous system (AS), an Internet service provider (ISP), or an Internet organization responsible for managing a set of Internet addresses an organization that allows entities to obtain IP addresses. Some illegitimate users may rely on hosting organizations to create multiple IP addresses and create user accounts from those IP addresses.

If a relatively high percentage (e.g., 60%) of user accounts in a group are associated with a known hosting organization, then it is at least probable (if not likely) that the image of the group is a bad image. Similarly, if the ratio of the mode of Internet organizations (regardless of whether the y are considered hosting organizations) associated with a group is greater than a particular threshold (e.g., 40%), then it is at least probable that the image of the group is a bad image.

Signup date of a user account refers to when the user account was created or when a user first registered with online account service 130. A signup date may include the month (e.g., May), year (e.g., 2015), date (e.g., Jul. 31, 2016), time range (e.g., between 2 pm-5 pm Pacific time), and/or exact time of day (e.g., 2:34 pm Pacific time). If a relatively high percentage of user accounts in a group (sharing the same image) were created on the same date or same month (e.g., 30%) of a particular year, then it is likely that the user accounts were created by an illegitimate user.

Identifying Bad Images: Cont.

In an embodiment, block 230 involves analyzing multiple attributes. Each attribute may be associated with a different weight. Different weights for different attributes means that some attributes may be more indicative of illegitimate activity than other attributes. For example, if the IP probability estimate is a stronger signal of illegitimate activity than the ratio of the mode of IP addresses, then the average IP probability estimate may be associated with a higher weight than the ratio of the mode of IP addresses. These weights may be deduced heuristically or through a machine learning algorithm such as logistic regression.

Regardless of whether a different weight and/or a different scoring methodology is used for each attribute, each attribute may result in a different score, which is then summed with scores of other attributes and aggregated in some way, such as calculating an average score, a median score, or selecting the highest score.

At block 240, based on the analysis of the one or more attributes, a determination is made whether the image is "bad." A result of the analysis of block 230 may be a score that represents a likelihood or probability that the image is bad. If multiple attributes are considered in block 230, then the score may be based on multiple scores, one for each attribute.

The score (whether based on a single attribute or multiple attributes) may be compared to a particular threshold. For example, if the score is above the particular threshold, then the image associated with the group of user accounts is labeled (or considered) "bad." Otherwise, the image is labeled "good."

Online account system 130 may store a set of bad images and a set of good images. If an image is determined to be "bad" based on process 200, then the image is added to the set of bad images (block 250). Similarly, if an image is determined to be "good" (or at least not "bad enough") based on process 200, then the image is added to the set of good images (block 260). A subset of the images in the set of bad images may have been manually added (i.e., based on human observation and input) to that set. Similarly, a subset of the images in the set of good images may have been manually added to that set.

In a related embodiment, different ranges of scores correspond to different classifications. For example, if an image is associated with a score between 0.7-1.0, then the image is classified as "bad"; if an image is associated with a score between 0.4-0.7, then the image is classified as "not bad"; and if an image is associated with a score between 0-0.4, then the image is classified as "good."

In an embodiment, an image is initially classified as unevaluated. Later, when the image is evaluated, the image is classified as good, bad, or not bad. Later, the image may be reevaluated and classified as good, bad, or not bad.

Reevaluating Images

In an embodiment, an image that has not been determined to be bad is evaluated (or reevaluated) at a later time. In one scenario, a first image does not match any other image stored in online account system 130. Thus, the first image is initially considered "good," "not bad," or "unevaluated." Later, when a second image is analyzed to determine whether it is bad, the second image matches the first image. At this stage, the user accounts associated with the first and second images are considered a group and one or more attributes of the group are analyzed to determine whether to classify the first and second images as bad.

Alternatively, a threshold number of images need to match in order to initiate a determination of whether the images should be classified as bad images. For example, a group of user accounts are analyzed once it is determined that the number of user accounts in the group is eight. Thus, before the number reaches eight, a determination of whether the image of that group is bad has not been performed.

In another scenario, after an analysis of attributes of a group of user accounts has been performed, the image of that group is not considered bad. Some time later, the image (or rather attributes of the group of user accounts that include the image) are re-evaluated to determine whether the image is a bad image. For example, an illegitimate user may begin using a particular image that was previously classified or labeled as "good." Reevaluating previously classified good images will catch such illegitimate users.

One or more criteria are used to determine when to reevaluate an image. The one or more criteria may be based on time, based on size of group, based on user input, and/or based on individual attributes. For example, an image is reevaluated every month. In that time, some of the attributes of the image's corresponding group may change, such as a ratio of blocked members or a ratio of report spam, even though the number of user accounts in the group has not changed. As another example, an image is reevaluated when the corresponding group of user accounts that include the image increases in size by a particular threshold number of user accounts (e.g., five). As another example, an image is reevaluated when any one of the attributes (of the corresponding group of user accounts) described previously changes substantially, such as an increase of 50%. As another example, an administrator of online account system 130 provides input that pertains to a particular image and causes the particular image to be reevaluated. As another example, one of the attributes of an image's group is tracked (e.g., ratio of blocked members) and if the attribute's value changes or changes substantially (e.g., over 25%) over a period of time, then the image is reevaluated.

Approaches for Analyzing Attributes of a Group of User Accounts

As noted previously, one or more attributes of a group of user accounts are processed using one of a number of approaches. In one approach, online account system 130 stores multiple analysis rules, each of which is applied to one or more attributes of a group of user accounts. Each rule corresponds to a different attribute or combination of attributes. Each rule may output a binary 1 or 0, corresponding to a "yes" or a "no." Thus, applying the rules to attributes of a group of user accounts may yield a whole number greater than 0. A threshold may be defined (e.g., 5), such that a score above that threshold will cause the image associated with the group of user accounts to be labeled "bad." Conversely, a score below that threshold will cause the image to be labeled "good." Thus, the threshold may indicate a total number of attributes that are characteristic of illegitimate users.

Model Approach

In another approach, a model is created, trained, and is used to make the determination of whether to label an image "bad." Thus, attributes associated with a group of user accounts are inputs to the model, which outputs a score that is used to determine whether to label an image "bad." In modeling parlance, the attributes that are used to train a model and are input to the trained model are referred to as "feature values," which correspond to "features" that the model is configured to track.

A model is trained using labeled data. For example, some labeled data may be actual real-world examples of groups of user accounts that share the same image. Thus, the model is trained to learn the features that make an image "bad." As another example, labeled data may be generated automatically based on one or more rules, such as generating a set of user accounts that share common features.

Examples of features that may be used to train a model include the attributes described previously, namely IP probability estimate, ratio of distinct signup time/date range, ratio of blocked members, ratio of spam reported, ratio of mode of ISPs, ratio of mode of IPs, ratio of mode of join cities, ratio of mode of hosting organizations. Other features may be used to train the model, such as average number of connections (i.e., in a social network), average number of page views of other user profiles requested in one 24-hour period, and average number of "reputable" connections (where a "reputable" connection is determined based on one or more criteria).

Training Data

The model may be trained using different sets of attributes of "bad" groups of user accounts, labeled as such. In one approach, attributes of all known (or at least labeled) bad groups are used to train the model. In another approach, attributes of a subset of all bad groups are used to train the model. For example, each bad group may be associated with an illegitimate user. Some illegitimate users submitted (or are associated with) multiple bad groups of user accounts. A randomly selected bad group is selected from each illegitimate user. If, for example, attributes of bad groups from the same illegitimate user are used to train the model and the bad groups had identical (or at least very similar) feature values, then the model may be trained "too much" for that illegitimate user and may not detect bad groups from other illegitimate users.

Additionally, attributes of all known (or at least labeled) "good" groups of user accounts may be used to train the model. A group may be automatically identified and labeled as "good" if each user account in the group is a member (of online account system 130) that is deemed in good standing, such as a member who has over five hundred connections, has connections to a threshold number of other members that are deemed to be in good standing, or has paid for one or more services provided by online account system 130. In the event human labelers are not available for labeling images into "good"/"bad", the percentage of restricted accounts with an image may be used as a criterion to label. For example, if an image is associated with at least 25% restricted accounts and there are at least five accounts, then the image is labeled "bad;" otherwise, the image is labeled "good."

Validation

In an embodiment, the model is validated by selecting a number of data sets (or attributes of groups of user accounts) and applying them as input to the model. Each data set is also known (or at least deemed) good or bad. The model generates a score that indicates whether an image of a group of user accounts is good or bad and that result is compared to the correct answer. If the model is correct a certain percentage of the time (e.g., 99%), then the model is deemed validated and ready for use in production against images of groups of "live" or actual user accounts.

If the model is not correct a threshold percentage of the time, then the model is not ready for production. One of multiple approaches may be used at this point. In one approach, a new model is created and trained on a different set of training data, such as randomly-selected groups of user accounts from known illegitimate users. In another approach, the non-validated model is trained based on attributes of additional groups of user accounts that are considered similar to the group(s) whose images the model incorrectly scored.

Figure 3:
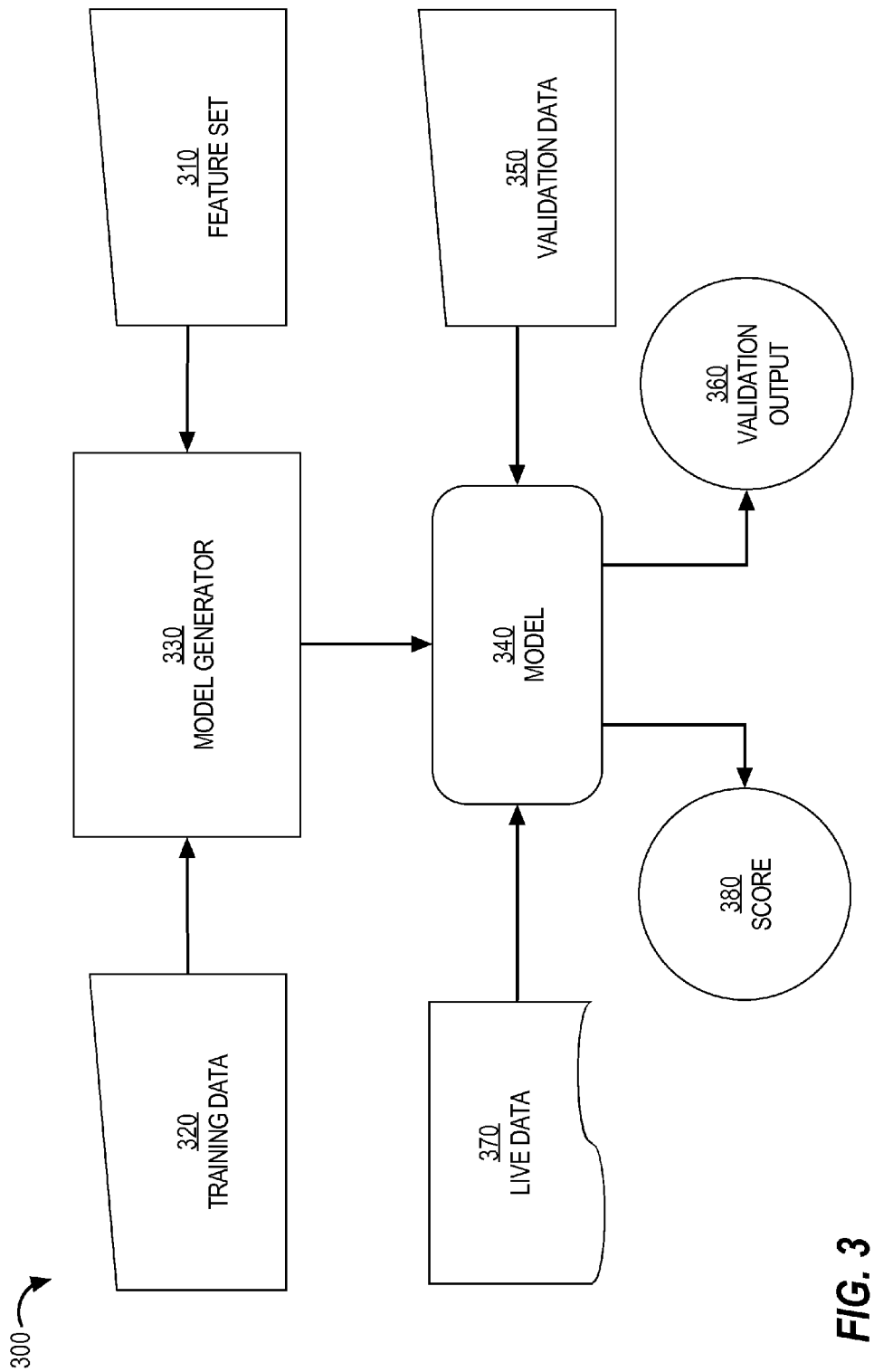
FIG. 3 is a block diagram that depicts a process for generating, training, and using a model for detecting address book upload abuse, in an embodiment.

FIG. 3 is a block diagram that depicts a process 300 for generating, training, and using a model for detecting bad images, in an embodiment. Process 300 may be implemented by one or more components in online account system 130.

Feature set 310 is provided as input to model generator 330. Feature set 310 may be specified by one or more users. Feature set 310 may include one or more of the features described previously.

Training data 320 is provided as input to model generator 330. Training data 320 comprises multiple data sets, each data set corresponding to attributes of a different group of user accounts that have the same (or similar) image. Some of the data sets are labeled as "bad" while other data sets are labeled as "good." The data sets in training set 320 may have been gathered over a long period of time or may be restricted to only groups of user accounts that have been "seen" (or received by online account system 130) over a relatively recent period of time (e.g., one year).

Model generator 330 analyzes training data 320 based on the features indicated in feature set 310. Output of model generator 330 is model 340. After the training stage, model 340 may have "learned" that some features are not indicative or determinative of predicting "bad" images.

Before using model 340 for "live" (or actual) groups of user accounts that have not yet been analyzed in this manner, model 340 is validated based on validation data 350, which includes multiple data sets, although the number of data sets in validation data 350 may be much less (e.g., three times less) than the number of data sets in training data 320. Model 340 generates validation output 360 that indicates a score for each data set in validation data 350.

Although FIG. 3 depicts model 340 has receiving validation data 350 and live data 370, a different version of model 340 may receive and process live data 370 than the version that received and processed validation data 350. Thus, an analysis of validation output 360 may indicate that model 340 is not ready for production or for use on "live" groups of user accounts. Therefore, model generator 330 or another component (not depicted) may refine or further modify model 340.

A score threshold may be selected after model 340 is validated based on analyzing validation output 360. Once an acceptable score threshold is selected, live data 370 is provided as input to model 340, which produces score 380.

Selecting a Score Threshold

As described previously, the model outputs a score. In order to determine whether an image is bad, the score is interpreted, such as by determining whether the score is greater than (or less than) a particular threshold. In an embodiment, the particular threshold is selected to ensure a low false positive rate. In other words, an image should not be determined to be "bad" when the user accounts in the corresponding group are "good" or from members with legitimate purposes. On the other hand, the model should identify a high percentage of bad images (referred to as the "true positive rate" or "recall").

If a relatively low score (e.g., 0.01 on a 0-to-1 scale) is chosen as the threshold above which a scored image is considered a bad image, then, although there will be a high true positive rate, there will be also be a high false positive rate. On the other hand, if a relatively high score (e.g., 0.99 on a 0-to-1 scale) is chosen as the threshold above which a scored image is considered a bad image, then, although there will be a low false positive rate, there will be also be a low true positive rate. Thus, the higher the true positive rate, the higher the false positive rate. Similarly, the lower the false positive rate, the lower the true positive rate.

Accordingly, in an embodiment, these two metrics (false positive rate and true positive rate) are used to select a score threshold. The score that is set as the threshold is selected such that the true positive rate is above a first threshold percentage (e.g., 70%) and the false positive rate is below a second threshold percentage (e.g., 0.5%).

In an embodiment, the score threshold is updatable. For example, later, if emphasis is being placed on catching more illegitimate users, then the score threshold may be decreased. Alternatively, if use of the same image in bad user accounts is diminishing, then the score threshold may be increased. Such a modification of the score threshold may be manual or automatic. For example, certain inputs (such as a number of member complaints about being blocked or restricted in some manner in the last week) may be used to determine whether to increase or decrease the score threshold.

Feature Scaling

In an embodiment, some of the feature values are scaled or normalized before being processed by the model. Examples of such features include the IP probability estimate and the average number of connections of the user accounts in a particular group. The difference in these numbers may be significant. Specifically, the IP probability estimate is between 0 and 1, while the average number of connections in a group may be over two hundred. Therefore, normalizing feature values will allow the feature values to be processed without large feature values dominating small feature values in the analysis.

One approach to normalize is to calculate a z-score for a feature value. Calculating z-score involves dividing the difference between the feature value and the mean (which refers to the mean of that feature over all the values in the training set) by the standard deviation. The result is a value between −1 and 1.

Model Type

Embodiments are not limited to the type of model that is used. In an embodiment, logistic regression, one type of classification model, is used to model a training data set of known (or labeled) bad images and good images.

Logistic regression is used to predict a binary response from a binary predictor, which is used for predicting the outcome of a categorical dependent variable based on one or more predictor variables (or "features"). That is, logistic regression is used in estimating the parameters of a qualitative response model. The probabilities describing the possible outcomes of a single trial are modeled, as a function of the explanatory features, using a logistic function.

The following is an example logistic function that may be used to generate a score based on a set of feature values:

$$p(y = 1 \mid x, \theta) = \frac{1}{1 + \exp(-\theta^T x)}$$

where X is the set of feature values, θ is the set of coefficients or weights that are applied to the feature values, ($\theta^T$ X) is the sum of the product of each feature value with its corresponding coefficient/weight. The output of this logistic function is a score between 0 and 1.

The following is an example objective function that may be used to choose a number of coefficients (and, thus, a number of features to use in the model) and a size of each coefficient.

$$\text{argmax}_\theta \sum_{i=1}^{m} \log p(y_i \mid x_i, \theta) - \alpha R(\theta)$$

where $X_i$ refers to a particular feature value and m refers to the number of features in the model.

R(θ) may be determined with the following formula:

$$L1 : R(\theta) = \|\theta\|_1 = \sum_{i=1}^{n} |\theta_i|$$

R(θ) involves summing the absolute value of each coefficient $\theta_i$. An effect of αR(θ) on the remainder of the objective function (argmax$_\theta$) is penalizing the usage of too many coefficients and, thus, too many features. After θ is determined by the objective function, θ is provided as input to the logistic function, along with X (i.e., feature values of a particular group of user accounts), to generate a score for the image.

Processing New Members

Figure 4:
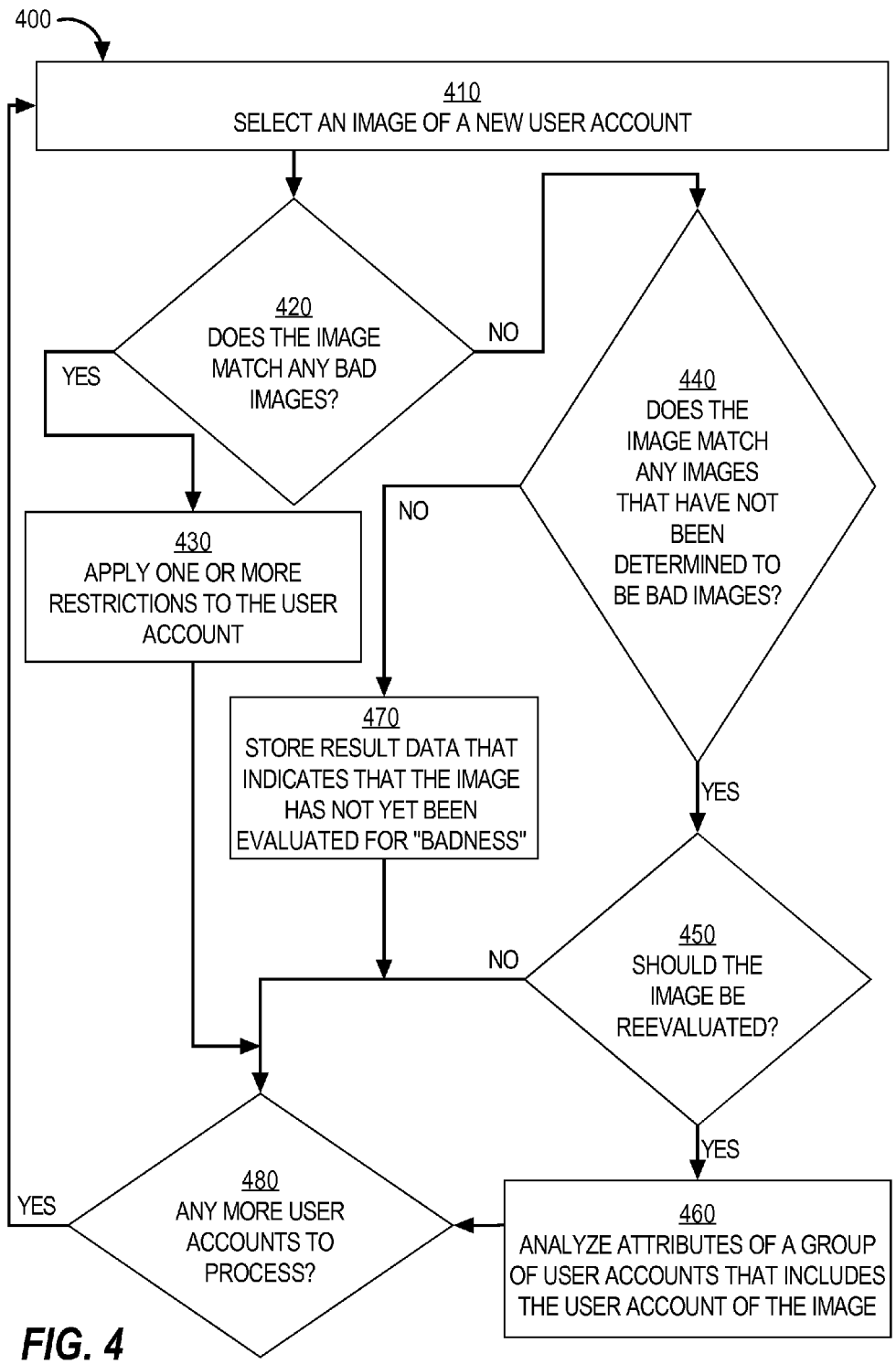
FIG. 4 is a flow diagram that depicts a process for processing images of new user accounts, in an embodiment.

FIG. 4 is a flow diagram that depicts a process 400 for processing images of new user accounts, in an embodiment. Process 400 may be implemented by online account system 130.

At block 410, a particular image of a new user account is selected. A "new user account" may be of a user that recently registered with online account system 130. Alternatively, a "new user account" may be of a user that recently added an image to the user account that may be relatively old (e.g., 4 months old). Similarly, a new user account may be a user account whose image has not yet been processed. Thus, the "new" user account may have been created days, months, or years in the past.

At block 420, it is determined whether the particular image matches any bad images. If so, then process 400 proceeds to block 430. Else, process 400 proceeds to block 440.

The same process for comparing two images described previously with respect to FIG. 2 may be used in block 420.

At block 430, one or more restrictions are applied to the new user account. An account restriction may be one of multiple types. One type of restriction is a blocked account where an end-user that attempts to access the account is unable to access it. Another type of restriction is a request restriction where the number and/or types of pages that the user of the restricted user account can request is limited. For example, a user of a user account may be restricted from accessing more than two profile pages per day. As another example, the user may be restricted to viewing only profile pages of already-established connections, contacts, or "friends" of the user.

In an embodiment, the number and/or type of restrictions may vary depending on how "bad" the particular image is. Some bad images may be more "bad" than others. For example, a first bad image may be associated with a relatively high percentage of blocked accounts (e.g., 90%) while a second bad image may be associated with a relatively moderate percentage of block accounts (e.g., 40%). Thus, the first bad image may be associated with a higher "bad" score than the second bad image. Therefore, the user account associated with the first bad image may have more restrictions or may have more restrictive restrictions than the user account associated with the second bad image.

At block 440, it is determined whether the particular image matches any images that have not been determined to be bad images. Such images may include an image that has been processed before but not evaluated for badness (e.g., the image is unique) and may include an image that has been evaluated before and it was determined that the image was not a bad image. If the determination of block 440 is affirmative, then process 400 proceeds to block 450. Else, process 400 proceeds to block 470.

At block 450, it is determined whether the particular image should be reevaluated, for example, according to block 230 of FIG. 2. One or more criteria may be used to make this determination, such as the number of user accounts that include an image that matches the particular image being greater than a particular threshold (e.g., ten) or the ratio of such user accounts that are blocked being greater than another threshold (e.g., 30%). If block 450 results in the affirmative, then process 450 proceeds to block 460. Else, process 450 proceeds to block 480.

At block 460, attributes of a group of user accounts that include the new user account and user accounts that include an image that matches the particular image are analyzed, such as according to block 230. Block 460 also involves labeling the particular image as a bad image if the result of the analysis is that the particular image is bad.

At block 470, result data is stored that indicates that the particular image has been processed but not yet evaluated for "badness." In other words, the particular image is associated with the status "unevaluated." The result data may be metadata that is stored with (or in association with)

the new user account. Alternatively, the result data may be based on adding the particular image to a set of images that have been processed but not yet evaluated for badness. Later, when another image is identified in block 410 of another iteration of process 400, that other image may be compared to the particular image as part of block 440.

At block 480, it is determined whether there are any more new user accounts, or user accounts whose images have not yet been compared to bad images. If so, then process 400 returns to block 410.

While process 400 is described as occurring in a particular order, process 400 may be performed in a different order or some blocks may not be performed at all. For example, process 400 may proceed to block 480 after block 420 or block 430, if result of block 420 is affirmative. Therefore, process 200 is performed independent of process 400.

Applying Restrictions: Multiple Factors

As described herein, once an image of a user account is determined to be a bad image, one or more restrictions are applied to the user account. In an alternative embodiment, one or more additional factors are considered by online account system 130 (or a third-party service) before any restrictions are applied to the user account. For example, online activity associated with the user account may be suspicious and thus considered along with the user account including a bad image. As another example, an IP address associated with the user account (e.g., the "join" IP address) may have a bad reputation. One or more rules or models that are based on image reputation and the additional factors are considered before any restrictions are applied to a user account. Thus, having a bad image may not, in and of itself, be sufficient to apply a restriction to a user account.

White List

In an embodiment, a user account is labeled as "good" or as being created by a legitimate user. A user account may be determined to be good in a number of ways. For example, the number of connections of the user account to highly reputable people (in the social network context) may exceed a certain threshold. As another example, online behavior (e.g., number of page views of other user profiles) associated with the user account may be consistent with typical or normal user behavior. As another example, no other user may have reported spam from the user account for a certain period of time (e.g., four months).

However, the user account may be associated with an image that becomes "bad" after the user account is determined to be "good." Nevertheless, in an embodiment, once a user account is determined to be "good," metadata of the user account may be updated to indicate such. Alternatively, a list of "good" user accounts is maintained and updated to include an identifier for the user account. Either way, the user account is "white listed."

Later, if the user account is associated with a bad image (e.g., a user adds the bad image to the user account), then the no restrictions are applied to the user account. On the other hand, restrictions may be applied to other user accounts that are associated with the bad image, especially if the other user accounts have not yet been determined to be good accounts. For example, in block 220 of FIG. 2, any user accounts that have been white listed are excluded from the identified group.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
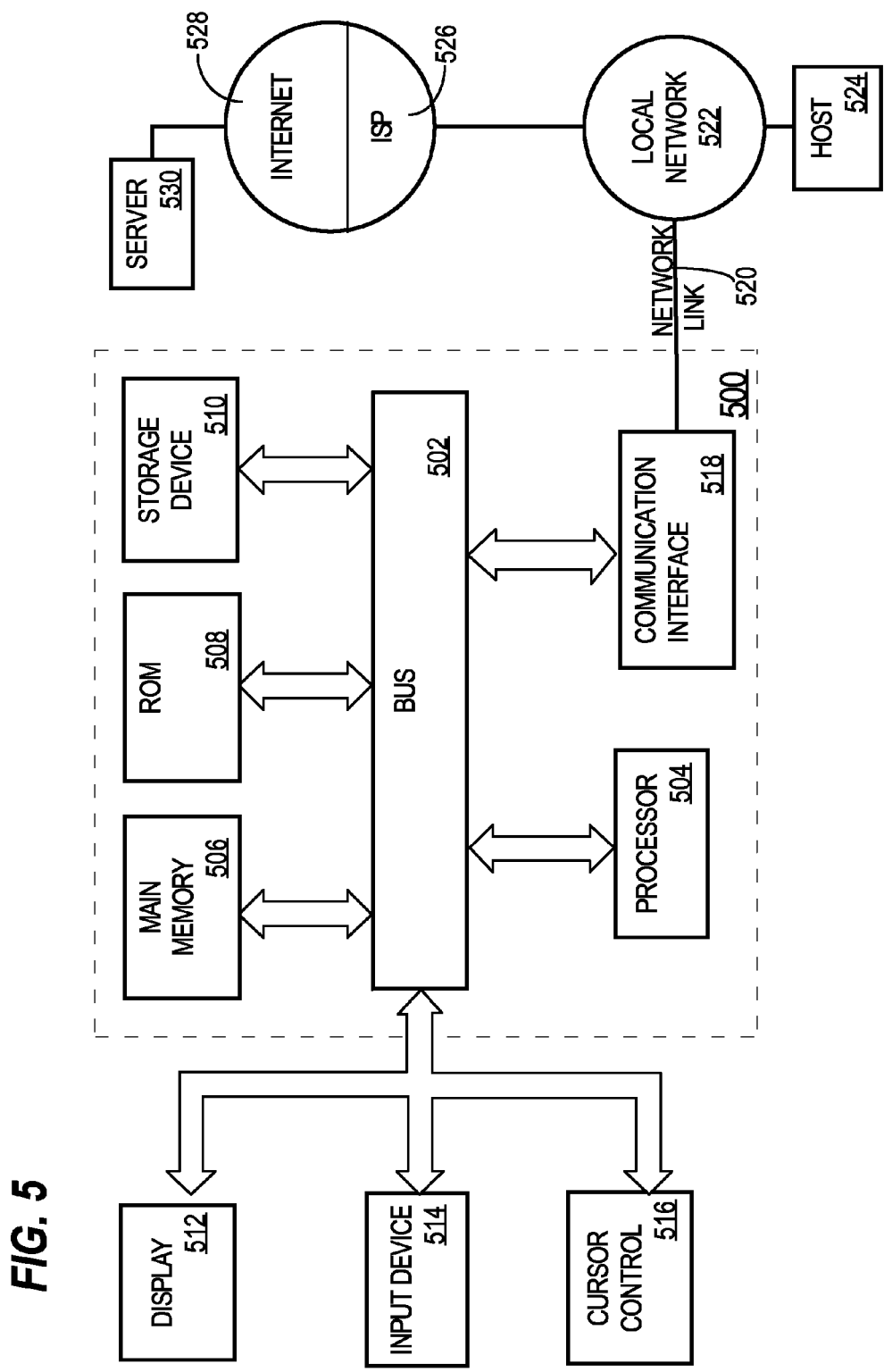
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a plurality of accounts that are associated with an online service, wherein each account of the plurality of accounts includes an image;
   storing a plurality of images;
   receiving, over a network, from a first client device, input that includes a first image;
   in response to receiving the input, determining whether the first image matches another image in the plurality of images;
   based on a determination that the first image matches another image in the plurality of images, determining to apply a restriction relative to the first client device;
   receiving, over the network, from a second client device, second input that includes a second image;
   in response to receiving the second input, determining whether the second image matches another image in the plurality of images;
   in response to determining that the second image does not match another image in the plurality of images, determining whether the second image matches an image that has not been classified as a bad image;
   in response to determining that the second image matches another image that has not been classified as a bad image, determining whether to evaluate a subset, of the plurality of accounts, that include the second image, wherein the subset of the plurality of accounts includes multiple accounts;
   in response to determining to evaluate the subset of the plurality of accounts, identifying one or more attributes of the multiple accounts, wherein an attribute of the one or more attributes pertains to the multiple accounts and is not an attribute of an individual account;
   based on the one or more attributes of the multiple accounts, applying one or more restrictions to a subset of the multiple accounts;
   wherein the method is performed by one or more computing devices.

2. The method of claim 1, wherein determining whether the first image matches another image in the plurality of images comprises:

generating a particular hash based on the first image;
for each image in a subset of the plurality of images, comparing the particular hash with a hash of said each image.

3. A method comprising:
storing a plurality of accounts that are associated with an online service, wherein each account of the plurality of accounts includes an image;
storing a plurality of images;
receiving, over a network, from a first client device, input that includes a first image;
in response to receiving the input, determining whether the first image matches another image in the plurality of images;
based on a determination that the first image matches another image in the plurality of images, applying a restriction to the first client device;
receiving, over the network from a second client device, second input that includes a second image;
in response to receiving the second input, determining whether the second image matches another image in the plurality of images;
in response to determining that the second image does not match another image in the plurality of images, determining whether the second image matches an image that has not been classified as a bad image;
in response to determining that the second image matches another image that has not been classified as a bad image, determining whether to evaluate a subset, of the plurality of accounts, that include the second image, wherein the subset includes multiple accounts;
determining, based on one or more criteria, to not evaluate the multiple accounts;
in response to determining to not evaluate the multiple accounts, storing result data that indicates that accounts associated with the second image have not been evaluated to determine whether the second image should be classified as a bad image.

4. The method of claim 3, wherein the one or more criteria includes (a) a number of accounts in the subset or (b) a ratio of the accounts, in the subset, that are blocked to the number of accounts in the subset.

5. The method of claim 1, further comprising:
determining that the first image matches a first particular image in the plurality of images;
based the first image matching the first particular image, generating a first score that reflects a likelihood that a user associated with the client device is an illegitimate user;
wherein determining to apply the restriction comprises determining to apply the restriction based on the first score;
receiving, over the network from a third client device, third input that includes a third image that is different than the first image;
in response to receiving the third input, determining that the third image matches a second particular image in the plurality of images;
based the third image matching the second particular image, generating a second score that is different than the first score.

6. The method of claim 5, wherein the restriction is a first type of restriction, the method further comprising:
based on the second score, determining to apply a second type of restriction relative to the third client device, wherein the second type of restriction is different than the first type of restriction.

7. The method of claim 1, further comprising:
making a determination that a particular account of the plurality of accounts is legitimate;
after making the determination:
determining that a particular image associated with the particular account is classified as a bad image; and
refraining from applying any restrictions to the particular account based on the determination.

8. A method comprising:
identifying, in an online account system a group of user accounts that each includes a particular image that is associated with only legitimate user accounts;
identifying one or more attributes of the group of user accounts, wherein an attribute in the one or more attributes pertains to the group and is not an attribute of an individual user account;
performing an analysis of the one or more attributes;
wherein the one or more attributes includes one or more of:
  a ratio of (a) the mode of IP addresses associated with the group of user accounts to (b) a number of accounts in the group of user accounts;
  a ratio of (c) the mode of a city from which members associated with the group of user accounts joined a particular online service to (d) the number of accounts in the group of user accounts;
  IP probability estimates associated with the group of user accounts, wherein an IP probability estimate is an estimate of a likelihood that a user associated with an account in the group of user accounts will visit a web site from a particular IP address;
  a ratio of (e) a number of distinct signups associated with the group of user accounts within a particular time period to (f) a number of accounts in the group of user accounts;
  a ratio of (g) a number of blocked members in the group of user accounts to (h) the number of accounts in the group of user accounts;
  a ratio of (i) a number of members associated with the group of user accounts that are classified as spam members to (j) the number of accounts in the group of user accounts;
  a ratio of (k) the mode of internet service providers associated with the group of user accounts to (l) the number of accounts in the group of user accounts; or
  a ratio of (m) the mode of organizations associated with the group of user accounts to (n) the number of accounts in the group of user accounts;
based on the analysis, determining whether to classify the particular image as a bad image;
based on the analysis, classifying the particular image as a bad image;
based on the particular image being classified as a bad image, applying one or more restrictions to a subset of the group of user accounts;
wherein the method is performed by one or more computing devices.

9. The method of claim 8, wherein the one or more attributes include one or more of:
  a ratio of (a) the mode of IP addresses associated with the group of user accounts to (b) a number of accounts in the group of user accounts; or
  a ratio of (c) the mode of a city from which members associated with the group of users accounts joined a particular online service to (d) the number of accounts in the group of user accounts.

10. The method of claim 8, wherein, after the analysis, the group of user accounts includes one or more first user accounts that are considered legitimate user accounts and one or more second user accounts that are considered illegitimate user accounts.

11. The method of claim 8, wherein the one or more attributes include one or more of:
- IP probability estimates associated with the group of user accounts, wherein an IP probability estimate is an estimate of a likelihood that a user associated with an account in the group of user accounts will visit a web site from a particular IP address;
- a ratio of (a) a number of distinct signups associated with the group of user accounts within a particular time period to (b) a number of accounts in the group of user accounts;
- a ratio of (c) a number of blocked members in the group of user accounts to (d) the number of accounts in the group of user accounts;
- a ratio of (e) a number of members associated with the group of user accounts that are classified as spam members to (f) the number of accounts in the group of user accounts;
- a ratio of (g) the mode of internet service providers associated with the group of user accounts to (h) the number of accounts in the group of user accounts; or
- a ratio of (i) the mode of organizations associated with the group of user accounts to (j) the number of accounts in the group of user accounts.

12. A system comprising:
one or more processors;
one or more storage media storing instructions which, when executed by the one or more processors, cause:
- storing a plurality of accounts that are associated with an online service, wherein each account of the plurality of accounts includes an image;
- storing a plurality of images;
- identifying, within the plurality of accounts, a set of accounts that each includes a first image, wherein the set of accounts includes multiple accounts that have not been classified as illegitimate;
- after identifying the set of accounts, identifying a plurality of feature values of the set of accounts, wherein the plurality of feature values correspond to a plurality of features, wherein a feature value in the plurality of feature values pertains to the set of accounts and is not a feature value of an individual account;
- wherein the plurality of features includes one or more of:
  - a ratio of (a) the mode of IP addresses associated with the set of accounts to (b) a number of accounts in the set of accounts;
  - a ratio of (c) the mode of a city from which members associated with the set of accounts joined a particular online service to (d) the number of accounts in the set of accounts;
  - IP probability estimates associated with the set of accounts;
  - a ratio of (e) a number of distinct signups associated with the set of accounts within a particular time period to (f) a number of accounts in the set of accounts;
  - a ratio of (g) a number of blocked members in the set of accounts to (h) the number of accounts in the set of accounts;
  - a ratio of (i) a number of members associated with the set of accounts that are classified as spam members to (j) the number of accounts in the set of accounts;
  - a ratio of (k) the mode of internet service providers associated with the set of accounts to (l) the number of accounts in the set of accounts; or
  - a ratio of (m) the mode of organizations associated with the set of accounts to (n) the number of accounts in the set of accounts;
- based on the plurality of feature values, generating a score that indicates a likelihood that one or more accounts in the set of accounts are illegitimate accounts;
- based on the score applying one or more restrictions to the one or more accounts in the set of accounts;
- wherein generating the score comprises inputting the plurality of feature values into a model that generates the score and that is trained based on a training set of a set of known bad accounts and based on the plurality of features corresponding to the plurality of feature values.

13. The system of claim 12, wherein the plurality of features includes one or more of:
- IP probability estimates associated with the set of accounts;
- a ratio of (a) a number of distinct signups associated with the set of accounts within a particular time period to (b) a number of accounts in the set of accounts;
- a ratio of (c) a number of blocked members in the set of accounts to (d) the number of accounts in the set of accounts; or
- a ratio of (e) a number of members associated with the set of accounts that are classified as spam members to (f) the number of accounts in the set of accounts.

14. The system of claim 12, wherein the plurality of features includes one or more of:
- a ratio of (a) the mode of IP addresses associated with the set of accounts (b) to a number of accounts in the set of accounts; or
- a ratio of (c) the mode of a city from which members associated with the set of accounts joined a particular online service to (d) the number of accounts in the set of accounts.

15. The system of claim 12, wherein the instructions, when executed by the one or more processors, further cause, after generating the score:
- receiving, over a network, from a client device, input that includes a second image;
- in response to receiving the input, determining whether the second image matches another image in the plurality of images;
- based on a determination that the second image matches the first image, determining to apply a restriction relative to the client device.

16. The system of claim 12, wherein the training set includes multiple accounts that are considered legitimate accounts.

17. The system of claim 12, wherein the plurality of features include one or more of:
- a ratio of (a) the mode of internet service providers associated with the set of accounts to (b) a number of accounts in the set of accounts; or
- a ratio of (c) the mode of organizations associated with the set of accounts to (d) the number of accounts in the set of accounts.

18. The system of claim 12, wherein the instructions, when executed by the one or more processors, further cause storing first data that classifies a first subset of the plurality of images as bad images and storing second data that classifies a second subset of the plurality of images as good images.

19. The system of claim 15, wherein the instructions, when executed by the one or more processors, further cause:
- receiving, over a network, from a first client device, first input that includes a first particular image;
- determining that the first particular image matches an image in the plurality of images;
- based on the first particular image matching an image in the plurality of images, generating a first score that reflects a likelihood that a user associated with the first client device is an illegitimate user;
- receiving, over the network from a second client device, second input that includes a second particular image that is different than the first particular image;
- in response to receiving the second input, determining that the second particular image matches an image in the plurality of images;
- based on the second particular image matching an image in the plurality of images, generating a second score that is different than the first score.

20. The system of claim 12, wherein the instructions, when executed by the one or more processors, further cause:
- making a determination that a particular account of the plurality of accounts is legitimate;
- after making the determination, determining that a particular image associated with the particular account is classified as a bad image;
- refraining from applying any restrictions to the particular account based on the determination.

* * * * *